US006167630B1

United States Patent
Webb

(10) Patent No.: US 6,167,630 B1
(45) Date of Patent: Jan. 2, 2001

(54) ALIGNED LASER SYSTEM HAVING A COMBINED LEVEL AND SQUARE DEVICE

(76) Inventor: James Webb, 4025 Spencer St., #304, Torrance, CA (US) 90503

( * ) Notice: Under 35 U.S.C. 154(b), the term of this patent shall be extended for 0 days.

(21) Appl. No.: 09/184,155

(22) Filed: Nov. 2, 1998

Related U.S. Application Data

(60) Provisional application No. 60/098,593, filed on Aug. 31, 1998.
(51) Int. Cl.[7] .................................................. G01B 9/02
(52) U.S. Cl. ........................................... 33/354; 33/451
(58) Field of Search ............................ 33/342, 354, 371, 33/374, 381, 382, 384, 451, 465, 473, 485, DIG. 21, 427, 430

(56) References Cited

U.S. PATENT DOCUMENTS

| | | | | |
|---|---|---|---|---|
| 339,158 | * | 4/1886 | Finley ..................................... | 33/342 |
| 596,818 | * | 1/1898 | Moore ..................................... | 33/451 |
| 825,217 | * | 7/1906 | Hull et al. .............................. | 33/342 |
| 1,074,367 | * | 9/1913 | Keefauver ............................... | 33/342 |
| 1,703,006 | * | 2/1929 | Jay ......................................... | 33/385 |
| 2,502,235 | * | 3/1950 | Schultes et al. ........................ | 33/384 |
| 2,747,295 | * | 5/1956 | Drawdy .................................. | 33/354 |
| 2,810,198 | * | 10/1957 | Wilson .................................. | 33/342 |
| 4,152,838 | * | 5/1979 | Cook ..................................... | 33/374 |
| 5,446,969 | * | 9/1995 | Terenzoni .............................. | 33/451 |
| 5,519,942 | * | 5/1996 | Webb .................................... | 33/451 |

* cited by examiner

Primary Examiner—G. Bradley Bennett
(74) Attorney, Agent, or Firm—Roger A. Marrs

(57) ABSTRACT

A combined laser beam level and square apparatus includes a level having slots or openings along a common side so that the slots or openings may receive a rule or square device that is pivotally mounted thereon so as to be selectively placed in coextensive slots or openings of the level. The coextensive slots include shoulder guides which align the rule into a particular angular orientation such as a 90 degree position with respect to the level or 45 degree orientation or position with respect to the level. Releasable securement means are provided for retaining the level and a base, if used, in a fixed position and other retaining means are provided for holding the rule fixed to the level while in a selected coextensive slot or opening.

7 Claims, 3 Drawing Sheets

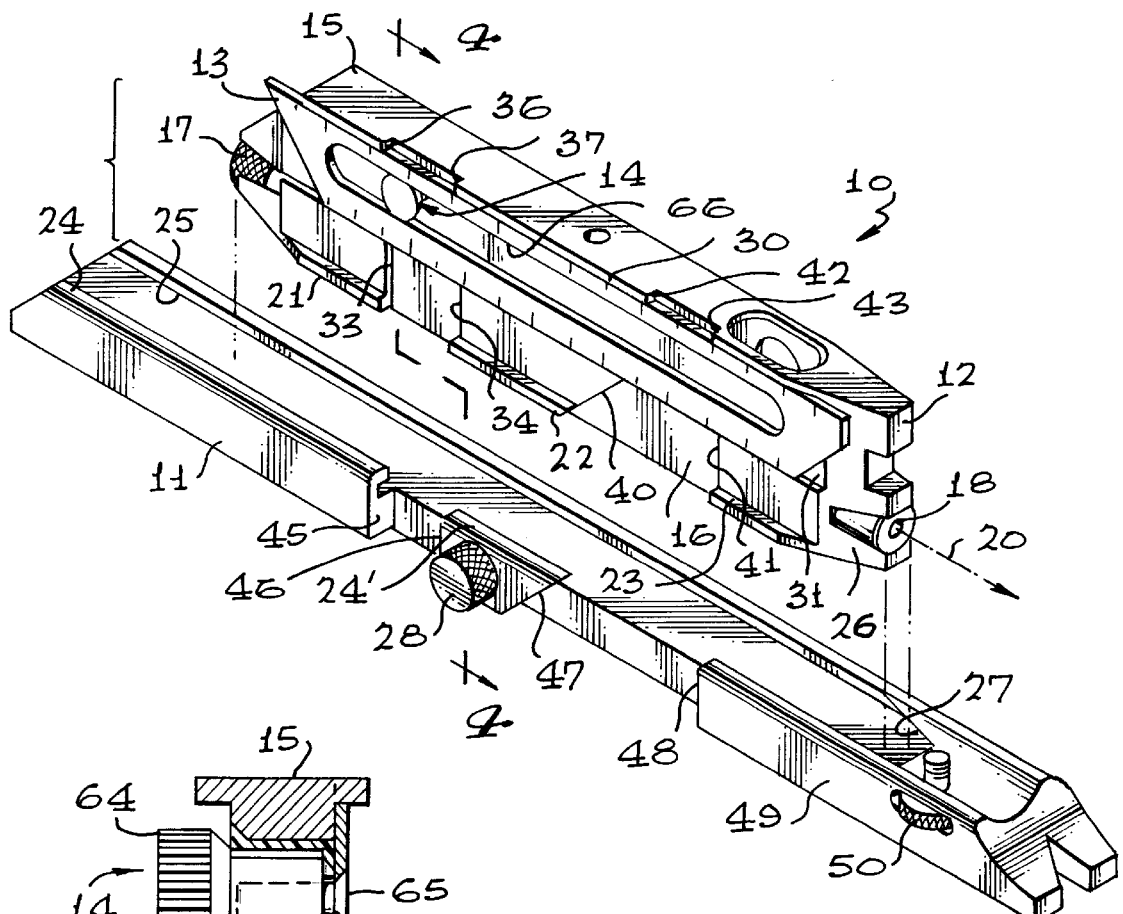
FIG. 1
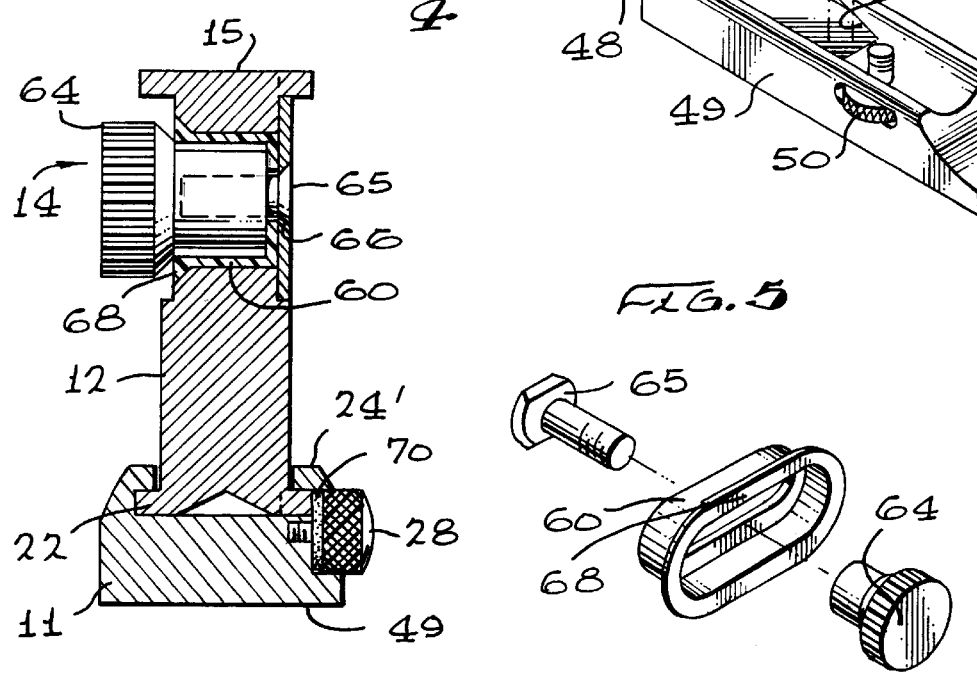
FIG. 4
FIG. 5

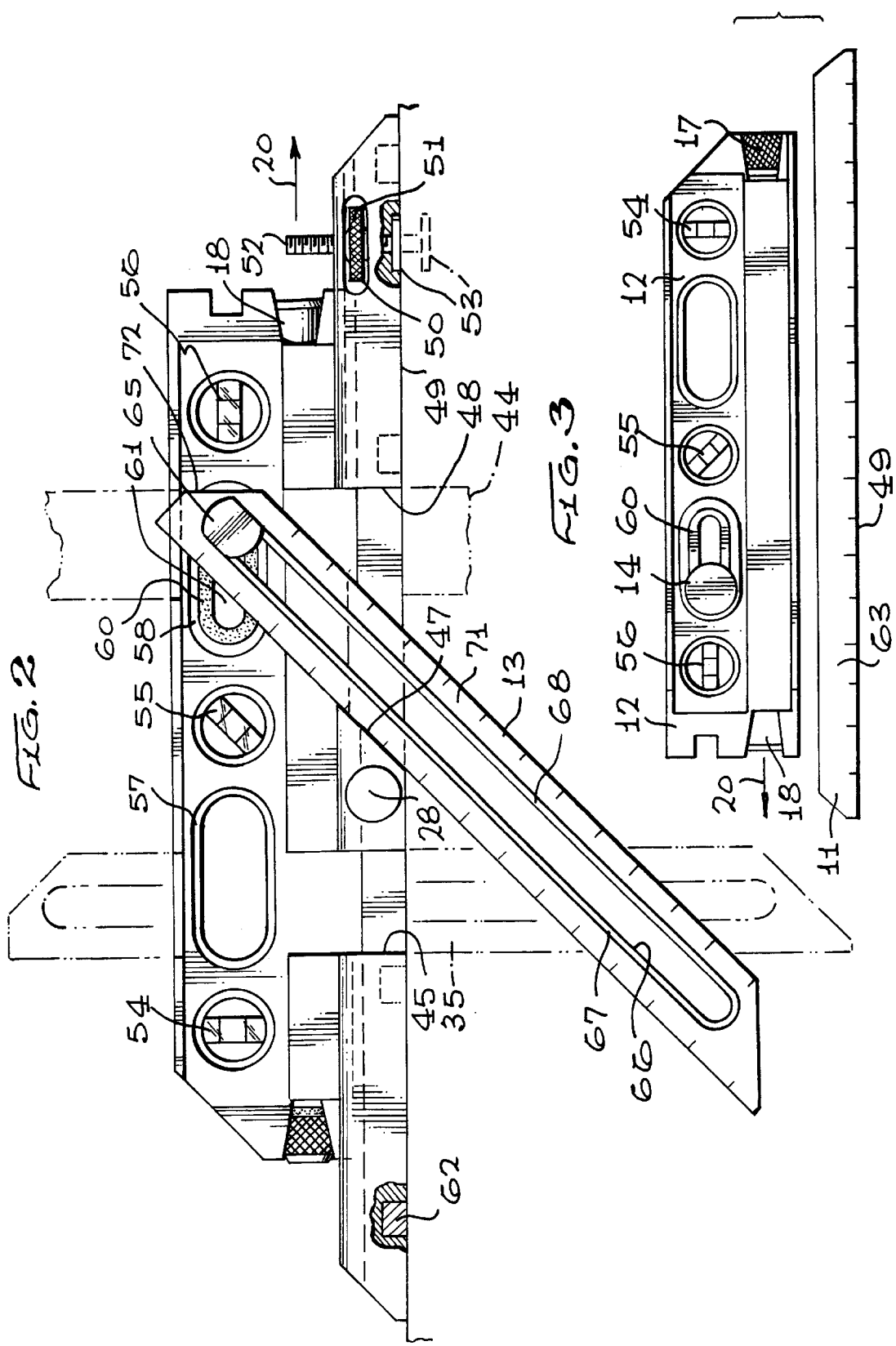

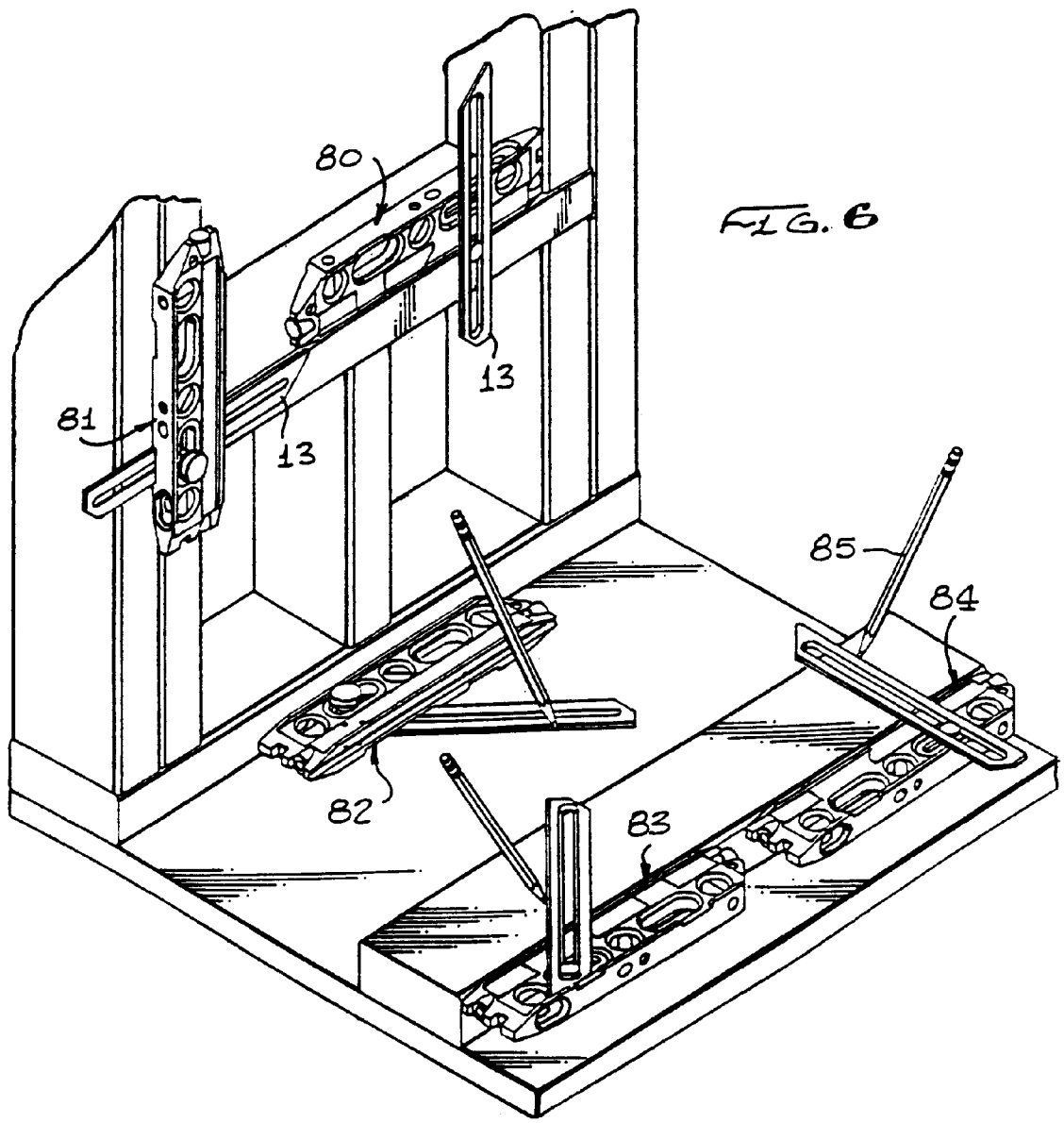

ALIGNED LASER SYSTEM HAVING A COMBINED LEVEL AND SQUARE DEVICE

Priority based on application No. 60/098,593 filed Aug. 31, 1998.

BACKGROUND OF THE INVENTION

1. Field of the Invention

The present invention relates to the field of alignment tools used in the construction industry, such as levels and squares, and more particularly to a novel combined level and square device with laser beam alignment indication and which incorporates a level having a measuring rule or square with alternate positions for accommodating 90 degree angles as well as 45 degree angles.

2. Brief Description of the Prior Art

In the past, it has been the conventional practice for construction workers to employ a level device of a laser and/or bubble type for determining a level surface or for making certain measurements. Other instruments are employed for determining angular relationships with respect to the level surface and such instruments are referred to as "rules" or "squares". By employing separate devices and instruments, such as levels and squares, the workman must purchase and store several different sizes and must make separate measurements using each separate device individually. Such a procedure is time-consuming, labor intensive and requires a considerable expense and investment in acquiring levels and squares of different sizes and angles. Furthermore, by using separate levels and squares at different times, the workman must make multiple notations in order to record the measurements and/or alignment positions being taken which, again, requires time and subsequent evaluation of the measurements so as to combine the results into a satisfactory workpiece or construction.

Therefore, there has been a long-standing need to provide a unitary device in combination with a laser beam generator which will permit the workman to make level measurements and square measurements simultaneously and in one procedure or operation. In most instances, when using a square instrument, the instrument must be maintained in a certain level or angular position and it is extremely useful to combine a level and a rule or square into a single instrument so that simultaneous measurement and recording of resultant data can be made without subsequent review and interpolation.

SUMMARY OF THE INVENTION

Accordingly, the above problems and difficulties are avoided by the present invention which provides a novel combined laser beam level and square apparatus which includes an elongated level with a laser beam generator emitting a laser beam which is parallel with respect to a level surface on either the top or the bottom of the level. The level includes an adjustable rule or square which may be carried in the storage recess when not in use on the side of the level and which further includes slots or openings along a common side of the level into which the rule or square may be placed for use in alternate positions in combination with the level itself. The rule or square includes measuring indicia along edges and is pivotally mounted on the level so as to be selectively placed in selective slots or openings of the levels in order to accommodate a variety of measurement and/or alignment positions. The slots or openings include shoulder guides which align the rule or square into a particular angular orientation, such as a 90 degree position with respect to the level or a 45 degree position with respect to the level.

A further feature of the invention couples the level to a base for alternate usage which may include a slope alignment device. In such instance, the base is elongated having a slot at its top for accommodating insertion of the level into the slot wherein the level includes guide rails for accommodating insertion and aligning the level with the base so as to become an integral part. The base includes slots or openings along a common side so that the slots or openings may be aligned with and be coextensive with the slots or openings on the side of the level. In this manner, the rule or square may project through the coextensive slots or openings so as to provide a particular angular orientation desired by the user. Releasable securement means are provided for retaining the level and the base in a fixed position and other retaining means are provided for holding the rule or square fixed to the level while in a selected coextensive slot or opening.

Therefore, it is among the primary objects of the present invention to provide a novel combined laser beam level and rule or square combination which may be readily employed on a selective surface in order to provide angular measurements with respect to the selected surface. The angles may selectively take the form of 90 degree angles, 45 degree angles or any other selected angular requirement.

Still a further object of the invention is to provide a novel single unitary instrument which includes a laser beam level device as well as an angular measurement device in the form of a square or rule which are both carried on a single instrument or may be combined with a base wherein the level and the base include cooperative and extensive slots or openings for accommodating the length of the square and the rule.

Another object of the present invention is to provide a novel combined laser beam level and square apparatus which may make simultaneous measurements without employing separate tools or instruments and which represents a labor-saving device for construction workmen.

Still a further object resides in providing a combined square and level device with a laser beam generating system that may be employed simultaneously along a horizontal surface, a vertical surface, a corner installation or any other flat surface wherein the apparatus has the ability to reside in a flush orientation with respect to that surface.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view showing the combined level, rule or square and base device incorporating the present invention;

FIG. 2 is a side elevational view of the combined device shown in FIG. 1 illustrating the coextensive slots, grooves and opening permitting the pivoted square or rule to be positioned therein;

FIG. 3 is an exploded side elevational view of the level and base illustrating that the level and base can be used together or separately;

FIG. 4 is an enlarged transverse cross-sectional view of the level and base as taken in the direction of arrows 4—4 of FIG. 1;

FIG. 5 is an exploded view of the pivot and holding device used to secure the square or rule to the body of the laser beam level; and FIG. 6 is a perspective view showing multiple and separate uses of the combined laser beam level with the rule or square illustrated in a plurality of operative positions.

DESCRIPTION OF THE PREFERRED EMBODIMENT

Referring to FIG. 1, the novel combined laser level, rule and base is illustrated in the general direction of arrow 10 wherein the base is represented by numeral 11 and the laser beam level is indicated by numeral 12. It is to be understood that the level 12 may be used independent of base 11. The level 12 includes an upper flat surface 15 and a lower flat surface 16 wherein either of the flat surfaces can be placed on a surface during use. The level 12 further carries an elongated square or rule 13 which may be angularly adjusted with respect to the level 12 by means of a releasable pivot means 14.

The interior of level 12 includes a laser beam generator which is operated by a rotatable thumbscrew 17 wherein the generated beam exits from a housing 18 on the opposite end of the level 12. The transmitted beam is indicated by numeral 20 and it is to be understood that the beam is parallel to the flat surfaces 15 and 16.

The opposite sides adjacent the flat bottom 16 of level 12 are provided with rails 21, 22 and 23 which are insertably received within slots 24 and 25 carried on the opposite sides of base 11 in spaced-apart relationship so as to define a slot therebetween into which the level 12 may be insertably placed. When it is desired to use the level in combination with the base, the tapered nose 26 of the level is inserted into the slot between guide slots 24 and 25 and the level is pushed forward until the tapered end 26 mates with the tapered end of the slot, as indicated by numeral 27. At this time, a clamping means 28 may be actuated to releasably secure the body of the level 12 to the base.

A primary feature of the invention includes the incorporation of the rule or square 13 for use with the level 12 by itself or in combination with the level and the base 11. When not in use, the elongated square or rule 13 is stored on the side of the level body between ribs 30 and 31 respectively. A reduced storage space or recess is defined between the ribs 30 and 31 so that the rule or square 13 may be placed into the recess for storage purposes when not in use. It is important to note that the ribs 30 and 31 extend outwardly from the side of the level to be flush with the exterior surface of the rule or square 13 so that the level is placed flat on a surface, the level will remain flat since that side of the level will be supported not only by the surface of square or rule 13 and the ribs 30 anc 31 but the rails 21, 22 and 23.

Referring now in detail to FIGS. 1 and 2, it can be seen that the rule or square 13 may be repositioned from its storage position, as shown in FIG. 1, to one of a selected positions as shown in FIG. 2. The side of body 12 includes a pair of recesses which will accommodate the holding of the square or rule 13 in place at a selected angular position with respect to the flat surface 15 or the flat surface 16. For example, a 90 degree position of the rule may take place by repositioning the rule from the storage position to occupy a recess between spaced-apart shoulders 33 and 34 so that the rule is in the position shown in broken lines by numeral 35 in FIG. 2. To further support and stabilize the rule when in the recess, shoulders 36 and 37 are provided in the rib 30 which are coextensive and in alignment with the shoulders 33 and 34.

For either a 90 degree or a 45 degree angle, the rule 13 may be placed in a recess defined by shoulders 40 and 41 which continue through the rails 22 and 23 in the same manner that the shoulders 33 and 34 extend through the rail 21 and 22 respectively. When the rule 13 is placed in the recess and is stabilized by bearing against shoulders 42 and 43, the rule takes the position as shown in broken lines in FIG. 2 by numeral 44. Once the square or rule has been placed within a selected recess, the fastening or retaining screw pivot means 14 may be tightened to hold the rule in place against the side of the level.

When the base 11 is used in combination with the level 12, the rule may be extended through recesses defined by either shoulders 45 and 46 or a recess defined by shoulders 47 and 48. These recesses are coextensive and match with the recesses provided in the side of the level 12. The base 11 includes a flat undersurface 49, which is parallel with the undersurface 16 of the level 12. As illustrated in FIG. 2, should it be desired to elevate the end of the level and base combination, a thumbscrew adjustment means is indicated by numeral 51 which includes a thumb-engaging nut 50 that rotatably turned on the threaded shank 52 so as to extend a foot 53 away from or towards the undersurface 49. Therefore, a beam 20 may be adjustably positioned to emit the beam at an angle with respect to the supporting surface.

FIG. 2 further illustrates that the level 12 includes a plurality of bubble capsules, identified by numerals 54, 55 and 56, and the bubble within the capsules may be used in combination with the generation of laser beam 20 from the laser beam generator 18. The bubble capsules are installed in the main body of the level 12 and are separated by a pair of elongated openings 57 and 58. Opening 58 is illustrated as being occupied by an elongated plug 60 having an elongated central opening 61 through which the pivot and retaining means 14 is disposed. It is to be understood that the plug 60, the pivot and the retaining means 14 and the square or rule 13 may be detached from the level and installed into the alternate opening 57 at the election of the user. The purpose for the user's selecting either opening 57 or opening 58 for installing the rule 13 resides in how the user wants to orient the rule with respect to the flat surfaces on either the level or the base. FIG. 2 also illustrates that the base and/or the level may include releasable holding means such as magnets, identified by numeral 62, that are exposed through the undersurface 49 of the base. When installed on the level 12, the magnets will exert a magnetic force from the undersurfacd 16.

In FIG. 3, the opposite side of the level is illustrated in a reduced scale and further illustrating that the level 12 may not be used in combination with the base 11. Both the base and the level may include measuring indicia, such as a numbered scale, along the bottom peripheral edges of either component. The scale is broadly indicated by numeral 63 placed along the bottom 49 of the base 11. The laser generator 18 is activated by means of rotating a thumbnut or screw 17 which closes a circuit with a battery internally stored in the level 12.

Referring now in detail to FIGS. 4 and 5, it can be seen that the pivot and retaining means 14 includes a turning knob 64 which is carried on the end of a threaded shaft terminating in a flanged portion 65. The flanges of the screw 65 engage with reduced portions of the rule 13 defined by an elongated slot 66 shown more clearly in FIG. 2. The opposite edges of the flanges of the screw 65 engage with the track portions 67 and 68 of the rule again, as shown in FIG. 2. The plug 60 is held in position by means of a peripheral flange 68 engaging with a chamfered surface outlining the hole or opening 61 and the frictional bearing or engagement of the back side of the rule 13 with the side of level 11.

FIG. 4 further illustrates the clamp 28 as having a turning nut which presses a clamp pad 70 into frictional engagement with the rail 22 of the level and the side of the base 11. Depending on where the position of the level is on the base, the pad will bear against some portion of the rail, such as 21, 22 or 23.

In view of the foregoing, it can be seen that the combined level, square or rule and/or base provide a useful tool for construction workers in determining proper angles, level surfaces and combinations thereof. The laser beam level 12 is slidably carried on the base 11 and is held in a desired position on the base by the clamping means 28. Depending on the angle at which the rule is desired to be placed, the plug 60 carrying the rule and its pivot and retention means 14 is placed in either opening 57 or 58. When placed in opening 58, the rule may be placed in a perpendicular position as shown in FIG. 2 by numeral 44 so that one linear edge thereof bears against the shoulder 41 and the edge of the base. In this position, shoulders 42 and 43 support the rule in this position. If it is desired to place the rule 13 in an angular position, the retaining means 14 is loosened and the rule is placed in the angular position shown by numeral 71. The flange nut 65, when loosened, will permit the rule 13 to be slid along its length to a desired position. After tightening, the rule 71 will bear against shoulder 40 and the upper part of the rule will bear against shoulder 43. It can be seen that the rule has a flattened surface at numeral 72 so as to match the shoulder 43 against which it will bear when the rule 71 is in the angular position. Again in FIG. 2, when it is desired to place the rule or square 13 in the recess at the other end of the level and/or base, the plug 60 is removed from opening 58 and inserted into the opening 57 and the retaining means 14. is tightened so that the length of the rule resides between shoulders 33 and 34 as well as shoulders 36 and 37. After tightening, the linear edge of the rule will be at a 90 degree angle with respect to the under flat surface 49.

Referring now to FIG. 6, it can be seen that the level or base may be placed on any horizontal surface, a vertical surface or any other angular or corner surface and the rule 13 can then be placed in any of the perpendicular or angular positions previously described.

Referring now to FIG. 6, various positions of use for the level incorporating the present invention are illustrated wherein numeral 80 indicates one position where the flat undersurface 16 of the level is placed on a horizontal frame with the rule 13 arranged in a perpendicular relationship. However, it is important to note that the rule is not in its storage recess and that the underside of the level cooperates with the flat backside of the rule to provide proper positioning of the level so that measurement can be taken. Numeral 81 illustrates another position wherein the rule is placed directly against flat beams. Therefore, the front side or back side of the rule may be used depending on the location of usage. Numeral 81 shows a flush relationship between the exposed exterior surface of the rule and the side of the level. The thickness of the rule is compensated for by the depth of the recess into which it resides. Numeral 82 further illustrates that the combined rule and level may be placed on a flat surface and again, the rule is flush with the side of the level. With respect to positions shown by numerals 83 and 84, the rule can be placed in an angular position or a perpendicular position and orientation can be placed against flat surfaces. The measurement or drawing of lines may be achieved by employing pencils, such as pencil 85 in connection with the rule and level indicated by numeral 84.

The level, square or rule and the base provide an integral construction when the retaining means are employed to fix the base, level and square or rule together into a unitary construction. The level may include bubble levels and/or laser generating means in order to establish a desired level orientation. Both the base and the square or rule include increments of measurements along selected peripheral edges that are visibly available to the user for notation purposes. Preferably, the square or rule is slidable with respect to the level and the base so that it may be extended in length or shortened at the selection of the user. Such adjustment is achieved through the employment of a pivot and thumb-screw arrangement carrying the square or rule on the level while the retaining or clamp means for fixing the level at a desired position on the base takes the form of a thumbscrew and friction pad operably carried on the base.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A level and rule combination comprising:
   an elongated level having a flat upper surface and a flat undersurface, both surfaces terminating between opposite ends of said level;
   an elongated rule having a given width;
   said level having a side provided with a first elongated recess immediately adjacent to said flat upper surface extending between said opposite ends and adapted to removably receive and store said rule;
   said level provided with a second recess, perpendicular to said first recess and communicating with said flat upper surface and said flat undersurface and means adapted to mount said rule in said second recess so as to cross said first recess and to project beyond said flat undersurface;
   means detachably carried on said level selectively coupled to said rule for releasably securing said rule with said level in either said first recess or said selected one of second recesses;
   a laser beam generator operably mounted on said level for emitting a laser beam from said level in parallel relationship with respect to said flat undersurface;
   said level further including a third open-ended recess angularly disposed with respect to said flat undersurface adapted to mount said rule in an angular relationship with respect to said first and said second recesses whereby said rule projects from said level at an angle;
   said level includes spaced-apart shoulders defining a width of each of said first, second and third open-ended recesses;
   said width of each recess adapted to receive the width of said rule;
   said level includes a pair of spaced-apart openings with each opening associated with said first and said second recesses; and
   said releasable securing means adapted to be selectively mounted in either of said pair of openings for placement and detachable retention of said rule in any one of said first recess, said second recess or said third recess.

2. The level combination defined in claim 1 including:
   an elongated base having a central slot along its length for insertably receiving said level in engagement with said flat undersurface;

said base having a pair of spaced-apart open-ended recesses coextensive with said second and third recesses respectively of said level.

3. The level combination defined in claim 2 including:

clamp means carried on said base operable to releasably secure said base with said level.

4. The level combination defined in claim 3 including:

slope leveling means carried on said base operable to raise and lower said level.

5. The level combination defined in claim 4 wherein:

said rule includes an elongated slot substantially extending along its length; and said retaining means including a plug with a central opening and a threaded screw passing through said central opening;

said screw having a flanged element engageable with said rule and a thumbnut rotatable on said screw to draw said flange element against said rule to secure said rule to said level.

6. A level with an adjustable rule combination comprising:

an elongated level with parallel flat upper and undersurfaces and opposite sides separating said surfaces;

a storage recess provided on a selected side of said level in parallel with said flat upper and undersurfaces and being defined by a pair of spaced-apart, parallel shoulders;

an elongated rule detachably carried on said level in said storage recess between said pair of shoulders;

means mounted on said level for releasably securing said rule with said level in said storage recess;

a laser beam generator carried on a selected end of said level generating a beam parallel with said flat upper and undersurfaces;

said selected side of said level is flush with said rule when said rule is in said storage recess; and a second open-ended recess provided on said selected side of said level perpendicular with respect to said storage recess and having shoulder portions defining said second open-ended recess wherein said rule is flush with said selected side when said rule is disposed in said second open-ended recess.

7. The level combination defined in claim 6 including:

said level having a third recess defined by a pair of spaced-apart shoulders angularly disposed with respect to said storage recess and said second open-ended recess for occupation by said elongated rule.

* * * * *